United States Patent Office 3,340,895
Patented Sept. 12, 1967

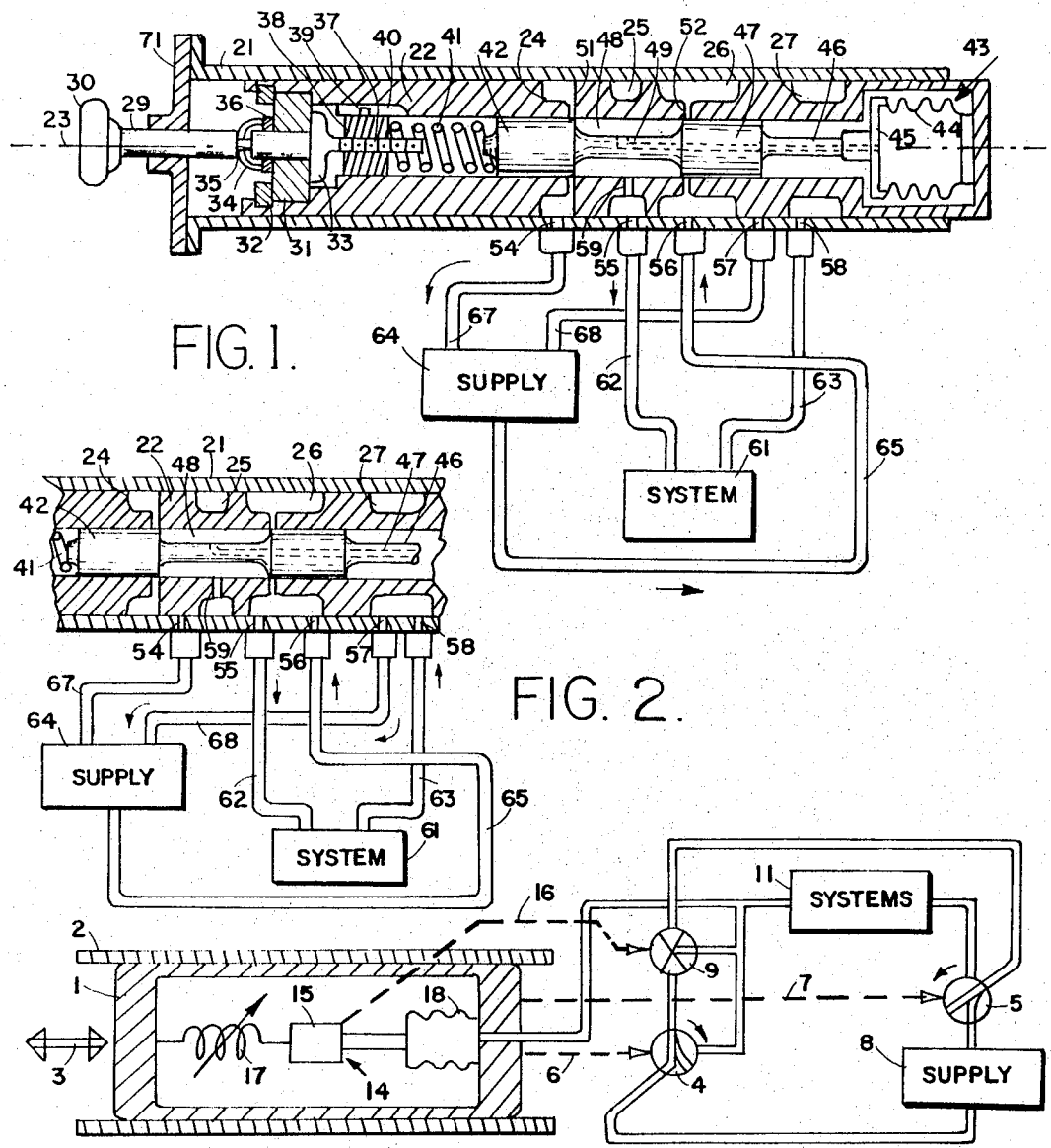

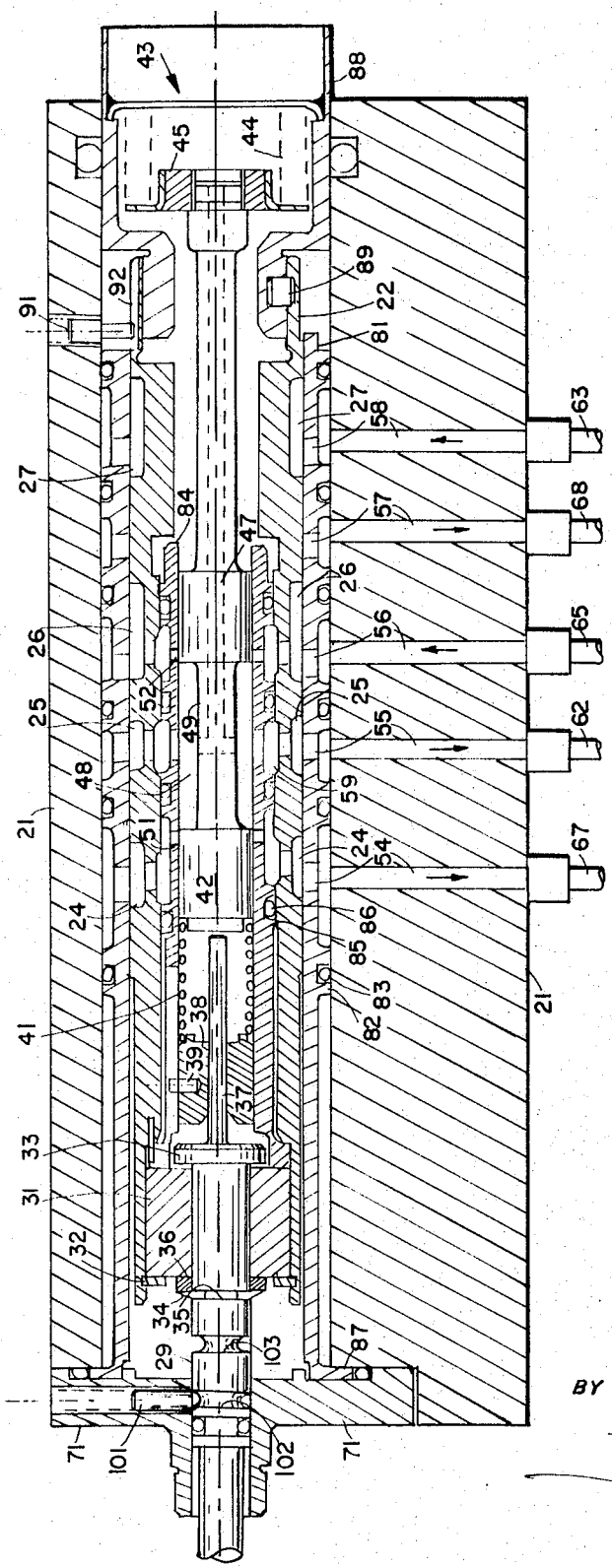

3,340,895
MODULAR PRESSURE REGULATING AND TRANSFER VALVE
Winthrop B. Osgood, Jr., Nashua, and Rudolph S. Petersen, Brookline, N.H., assignors to Sanders Associates, Inc., Nashua, N.H., a corporation of Delaware
Filed Aug. 27, 1965, Ser. No. 483,213
12 Claims. (Cl. 137—596)

This invention relates to fluid pressure regulators and more particularly to a regulator including pressure feedback means for controlling and transferring fluid to a utilizing system.

Systems operated by fluid pressure, whether they are pneumatic or hydraulic, generally require in addition to the source of pressurized fluid, means for regulating the pressure of the fluid and one or more valves for feeding the pressurized fluid to the operating parts of the system. Generally the two operations, regulating pressure and transferring fluid to the operating system, are performed by separate devices. Separate devices are employed because the different problems involved in regulating and transferring are not easily solved in a single unit. For example, regulating is usually accomplished by passing the pressurized fluid through a variable orifice to thereby induce a variable pressure drop in a closed flow loop. The fluid at regulated pressure is then tapped from this closed loop and fed via transfer valves to the operating parts of the system. The valving may be manual or solenoid controlled and as a rule is operated in one or two positions: completely open or completely closed. Thus, the fluid is delivered to the operating parts of the system at substantially the pressure provided at the regulator.

The separate functions of regulating devices and transfer valving particularly when tended by an operator, generally add to the complexity and difficulty of operating a pneumatic or hydraulic system. Accordingly, it is one object of the present invention to combine the functions of regulating and transferring the pressurized fluid to a system in a single modular device.

It is another object of the present invention to provide a device controlled by a relatively simple mechanical action to accomplish both the regulating and transferring functions in a system.

It is another object to provide a relatively compact device actuated by a single manually controlled element having two degrees of freedom of actuation, one for controlling transfer valving and the other for controlling pressure regulation.

It is another object of the present invention to effect the transfer valving operation by applying a simple push or pull to the control element and to accomplish regulation by imparting a simple rotary motion to the element.

The various embodiments of the present invention include an actuator element which is a shaft controlled, for example, manually by a human operator. The shaft has two degrees of freedom of movement relative to the housing. They are, for example, translation along the axis of the shaft and rotation about the axis of the shaft. The translational motion of the shaft positions a piston within the housing and in doing so accomplishes various valving operations. Pressure regulating mechanism carried by the piston is controlled by the rotational motion of the shaft. Thus, the operator need only push or pull the shaft to direct pressure regulated fluid to the operating parts of a system and then turn or twist the shaft to regulate the pressure. Thereafter, regulation can be interrupted at any time by simply pushing or pulling the shaft in the opposite direction.

Other objects and features of the present invention will be apparent from the following specific description taken in conjunction with the figures in which:

FIGURE 1 is a sectional view taken through the axis of the modular pressure regulating and transfer valve to illustrate the functioning of parts thereof to accomplish both regulation and transfer;

FIGURE 2 is a similar sectional view broken away to illustrate operation of the device when not regulating but merely transferring pressurized fluid to a system;

FIGURE 3 is a schematic illustrating principles of operation of the device; and

FIGURE 4 is a detailed sectional view taken through the axis of the device to illustrate the manner and mode of construction.

A schematic representation illustrating fundamental features of the present invention is shown in FIG. 3. The parts include a piston 1 and a sleeve 2 and means for moving the piston within the sleeve in the directions of the arrows 3. Movement of the piston directly actuates valves 4 and 5 via mechanisms 6 and 7. These are, for example, two position valves, and so movement of the piston in one direction positions these valves each in one position and movement of the piston in the opposite direction positions each of these valves in the other position. Thus, the valves 4 and 5 are ganged and operated together by motion of the piston 1 within the sleeve 2. Valve 4 directs pressurized fluid from a supply 8 which may be an accumulator or any other source of pressurized fluid, to a throttle valve 9 or to operational systems 11, depending upon the position of this valve. At the same time, valve 5 directs fluid from the systems 11 to the supply, or it directs fluid from the throttle valve 9 to the supply. Thus, the valving system is directly controlled by positioning the piston 1 in the sleeve 2 and directs unregulated pressurized fluid to the operating systems directly or directs the pressurized fluid to the regulating throttle valve 9 which in turn feeds regulated pressurized fluid at relatively low flow to the systems.

The control 14 for the throttle valve 9 is disposed within the piston 1, and thus, it moves with the piston. However, only motion of the regulator piston 15 relative to the piston 1 is effective to operate the throttling valve 9. This motion is administered to the valve 9 via a suitable mechanism 16. The position of the piston 15 within the piston 1 is established by a balance between two forces applied to it. One force is mechanically applied by, for example, adjustable spring 17, and the other is applied by pressurized fluid via, for example, a bellows 18. The bellows force represents the regulated pressure, and the spring force represents the regulation called for. A balance between these forces produces a null condition for which the position of the regulating piston 15 within the actuating piston 1 represents the regulated pressure. This position determines the setting of the throttle valve 9 which is turn determines the pressure of fluid fed to the bellows. Thus, feedback is provided to the regulator device.

The system illustrated in FIG. 3 is adaptable to be operated by a single shaft. The shaft positions the actuating piston 1 by a simple translational motion and adjusts the force applied by the spring 17 with a simple rotational motion. This, however, illustrates only one technique for accomplishing both regulation and transfer by application of simple control forces to a control element such as a shaft. Obviously, other types of control motions applied to a single control element could accomplish the same effect, and other types of throttle controls could be loaded into the actuating piston 1 in place of control 14 for controlling a throttling valve and still provide operation substantially as illustrated in FIG. 3.

A specific embodiment of the invention is illustrated by the sectional view taken through the axis of the modular pressure regulating and transfer valve shown in FIG. 1. This includes the module housing 21 which is, for example, tubular shaped, enclosing the transfer piston 22 which is disposed concentric with the housing on the axis 23 of the device. The transfer piston 22 fits snugly within the housing so that contiguous walls seal against the flow of the pressurized fluid. The piston is equipped with a number of annular cavities such as 24, 25, 26 and 27, which, depending upon the position of the piston within the housing, register with radial ports in the housing which, in turn, connect with fluid lines for conducting pressurized fluid to and from the device and directing the pressurized fluid to a utilizing system and the supply.

The transfer piston 22 is positioned within the housing by the control shaft 29. For example, the knob 30 at the end of the control shaft is pushed or pulled along the axis 23 to position the transfer piston within the housing. Connection between the shaft 29 and the transfer piston 22 is accomplished by the bearing block 31 which is locked in position at one end of the piston by a retaining ring 32 which holds the bearing snugly against the piston concentric therewith.

The shaft 29 is free to rotate within the bearing 31 but is prevented from translating through the bearing by the shoulder 33 on the shaft and a bowed retaining ring 34 which engages a groove 35 in the shaft and bears against bearing 31 through washer 36 taking up axial play between the shaft and bearing. Thus, translational motion of the shaft 29 along the axis 23 is imparted to the transfer piston 22 but the shaft is free to rotate about the axis 23 without imparting rotation to the piston.

A threaded portion 37 of the shaft 29 adjacent the shoulder 33 engages follower 38 which slides along the axis 23 within the transfer piston. The follower carries an anti-rotation pin 39 which rides in a slot 40 lying along the inside of the transfer piston. Thus, rotation of the shaft 29 causes the follower 38 to move along the axis 23 within the transfer piston 22. The follower 38 engages a spring 41 so that translational motion of the follower serves to load the spring against the regulating piston 42. The regulating piston 42 fits snugly within the transfer piston 22 so that contiguous surfaces form a seal to the pressurized fluid even though the regulating piston is free to move along the axis 23 within the transfer piston.

The position of the regulating piston 42 within the transfer piston 22 is established by a balance between the force applied via the spring 41 at one end of the regulating piston and the force applied via the bellows 43 which connects the other end of the regulating piston to the transfer piston.

The bellows 43 includes a flexible wall 44 sealed to a base plate 45 attached to a shaft 46 which extends from the regulating piston 42. The bellows also attaches and seals to the end of the transfer piston 22. A fluid passage 47 extends between the bellows and annular regulator cavity 48 bounded by a recessed portion 49 of the regulating piston 42 and the inside wall of the transfer piston 22.

Orifices such as 51 and 52 extend from the annular cavities 24 and 26 to the inside of the transfer piston 22 just at the edges of the regulator cavity 48, and the regulating piston 42 is disposed within the transfer piston 22 so that it partially blocks flow between the annular cavities 24 and 26 and the regulator cavity 48. Thus, a slight movement in an axial direction of the regulating piston 42 within the transfer piston 22 throttles fluid flow between the cavities 24 and 26 via the cavity 48 and so the fluid which accumulates in the cavity 48 is at throttled pressure; that is, the pressure of this fluid is regulated depending upon the positioning of the regulating piston 42 within the transfer piston 22.

Fluid conduit tubes extend from radial ports in the housing 21. These ports 54 to 58 are disposed to align with the annular cavities 24 to 27 and a radial opening 59 in the transfer piston 22 connects the port opposite annular cavity 26 with the regulator cavity 48 depending upon the positioning of the transfer piston within the housing.

FIGURE 1 illustrates positioning of the transfer piston 22 within the housing 21 for supplying pressure regulated fluid to a utilizing system 61. This is accomplished by pushing the shaft 29 so that the transfer piston slides within the housing to the position illustrated in FIG. 1. Thereafter, shaft 29 is twisted in one direction or another to increase or decrease the loading of the spring 41, and thus, the pressure drop is increased or decreased between the annular cavities 26 and 24.

The force exerted by the spring loading on the regulating piston 42 is opposed by the force exerted on the piston by the fluid in the bellows 43. The bellows force is directly proportional to the pressure of the fluid in the regulator cavity 48. Thus, the pressure of the fluid in the cavity 48 is adjusted by rotating the shaft 29 one way or the other. The pressure regulated fluid is supplied from cavity 48 via the radial opening 59 and cavity 25 to the port 55 which connects with fluid conduit 62 leading to the system 61. Under this condition of operation, the system 61 draws little or no fluid but merely employs the pressure of the fluid and so the return from the system carried by conduit 63 which connects to the port 58 in the housing is deadheaded at the annular cavity 27 in the transfer piston. Meanwhile, pressurized fluid from the supply 64 is conducted by the conduit 65 to the port 56 connecting to the cavity 26. This fluid flows through the orifices 52 and 51 leading into and out of the regulator cavity 48 and is returned to the supply 64 via port 54 and conduit 67. Thus, a continual flow of high pressure fluid flows through the regulating orifices at each end of the regulator cavity 48 providing at port 55 fluid at regulated pressure.

FIG. 2 is a similar sectional view of the device illustrating the positioning of the regulating piston 42, transfer piston 22, and housing 21 when the regulating functions are by-passed and only transfer valving is accomplished. The positioning illustrated in FIG. 2 is achieved by pulling the shaft 29 through the housing covering 71. As a result, the port 54 is deadheaded against the transfer piston, the radial opening 59 in the transfer piston is deadheaded against the housing, ports 55 and 56 in the housing are connected together via annular cavity 26 and ports 57 and 58 in the housing are connected via annular cavity 27. Thus, fluid from the supply 64 is fed directly to the system 61 and the regulator cavity 48 is by-passed. In addition, the return from the system 61 is directed to the supply via conduit 63, port 58, annular cavity 27, port 57 and conduit 68.

The requirements of the system 61 which could be met by structure incorporating features of the present invention are obviously of great variety. For example, the system might require a relatively high flow of pressurized fluid to fill the system or periodically replenish the system. In other words, the volume requirements of the system 61 may vary considerably from time to time. As these volume requirements change substantially, the regulating and transfer device incorporating features of the present invention would be operated as illustrated in FIG. 2 supplying a substantial flow of unregulated pressurized fluid to the system. Thereafter, by the simple act of pushing in the shaft 29 and turning knob 30 to regulate pressure, the system would be supplied with a relatively low flow of pressure regulated fluid for accomplishing the various purposes of the system. This would be accomplished by a simple translational and rotary manipulation of the control shaft of the single modular pressure regulating and transfer valve which connects the system to a supply of pressurized fluid. This is mentioned to illustrate only one use of the modular regulator transfer valve described in the embodiments of the invention. Numerous other uses are also possible.

FIG. 4 illustrates a section view of the modular regulating and transfer valve which is operated substantially as described above with reference to FIGS. 1 and 2 and which shows numerous details of construction not shown in FIGS. 1 and 2. Parts illustrated in FIG. 4 which substantially correspond with parts illustrated in FIGS. 1 and 2 are given the same reference number and additional parts and features are described below. As shown in FIG. 4, the inside of the housing 21 is lined with a transfer piston sleeve 81. The sleeve includes a number of pairs of peripheral rings such as 82 which carry O-rings such as 83 for sealing the sleeve against the inside wall of the housing. The O-rings form a number of sealed chambers at the end of the ports 54 to 58 in the housing. The transfer piston 22 fits within the sleeve 81 so that contiguous portions slideably engage with sufficient contact to provide a seal against the fluid flowing to the annular cavities 24 to 27.

Inside the transfer piston is located the regulating piston sleeve 84 which like sleeve 81 includes a number of pairs of peripheral rings such as 85 each enclosing an O-ring such as 86 which seals the sleeve to the inside of the transfer piston. The regulating piston 42 is disposed within the sleeve 84 with contiguous surfaces slideably sealing against the pressurized fluid.

At assembly, the directional piston sleeve 81 is inserted into the housing 21 and fixed in position as flange 87 at one end of the sleeve engages the housing. Next, the transfer piston 22 is inserted into the sleeve 81 and the bellows housing 88 is inserted in the transfer piston and locked in position by locking slug 89. Then, the anti-rotation pin 91 is inserted through an opening in the housing engaging a keyway 92 in the transfer piston. The regulating piston sleeve 84 is then inserted in the transfer piston and the regulating piston 42 is inserted inside of that so that one end of the regulating piston fixedly engages one end of the bellows 43, the other end of the bellows being fixed to the bellows housing 88. Thereafter, the spring 41 and follower 38 are inserted into the regulating piston sleeve 84 at the other end of the regulating piston. Next, threaded end 37 of the shaft 29 carrying the bearing 31 is screwed into the follower 38 and washer 36 and retaining rings 32 and 34 are inserted to lock the transfer piston, regulating piston sleeve, bearing and shaft together.

A plunger catch is provided in the housing cover 71 and includes a spring loaded slug 101 which engages one of two grooves 102 or 103 on the shaft 29. When groove 102 is engaged (as in the figure, fluid pressure is regulated and operation is substantially as described above with reference to FIG. 1. When the groove 103 is engaged, pressurized fluid is fed directly to the system 61 and is not regulated; thus, operation is substantially as described above with reference to FIG. 2.

This completes the description of a few embodiments of the present invention illustrating functional aspects of the invention as well as details of structure. The embodiments include means for regulating and transferring fluid pressure, both the regulation and the transfer being accomplished by manipulation of a single control element to supply the needs of a system. The embodiments described herein illustrate applications of features of the invention to provide useful devices and do not limit the spirit and scope of the invention as set forth in the accompanying claims.

What is claimed is:

1. A fluid pressure and flow control device comprising a source of pressurized fluid and a utilizing system, means for conducting said fluid to said utilizing system, means operatively associated with said conducting means for varying the pressure of said fluid in a portion of said conducting means, means operatively associated with said conducting means for directing the flow of said fluid to and from said utilizing system, first means operatively associated with said directing means for controlling said directing means and second means carried by said first means of controlling said means for varying pressure.

2. A fluid pressure and flow control device comprising a source of pressurized fluid and a utilizing system, means for conducting said fluid to said utilizing system, means operatively associated with said conducting means for varying the pressure of said fluid in a portion of said conducting means, valve means operatively associated with said conducting means for directing the flow of said fluid to and from said utilizing system, means for controlling said valve means and regulating means carried by said valve controlling means for controlling said means for varying pressure.

3. A fluid pressure and flow control device comprising a source of pressurized fluid and a utilizing system, means for conducting said fluid to said utilizing system, means operatively associated with said conducting means for varying the pressure of said fluid in a portion of said conducting means, means operatively associated with said conducting means for transferring the flow of said fluid to and from said utilizing system, means for controlling said transferring means and means carried by said transfer control means for controlling said means for varying pressure.

4. A device for regulating pressure of a fluid and for transferring fluid to and from a utilizing system comprising a source of pressurized fluid, means for conducting said fluid to and from said utilizing system, fluid conducting means for by-passing said system, means for transferring said fluid to said by-pass conducting means, means operatively associated with said by-pass conducting means for varying the pressure of said fluid transferred to said by-pass conducting means, means for operating said transferring means and means carried by said operating means for controlling said means for varying pressure.

5. A device for regulating pressure of a fluid and for transferring fluid to and from a utilizing system comprising a source of pressurized fluid, means for conducting said fluid to and from said system, fluid conducting means for by-passing said system, means for transferring said fluid to said by-pass conducting means and from said by-pass conducting means to said utilizing system, means operatively associated with said by-pass conducting means for varying the pressure of said fluid transferred to said by-pass conducting means, means for operating said transferring means and means carried by said operating means for controlling said means for varying pressure.

6. A device for regulating pressure of a fluid and for transferring fluid to and from a utilizing system comprising a source of pressurized fluid means for conducting said fluid to and from said system, fluid conducting means for by-passing said system, means for transferring said fluid to said by-pass conducting means and from said by-pass conducting means to said utilizing system, means operatively associated with said by-pass conducting means for varying the pressure of said fluid transferred to said by-pass conducting means, actuating means having two degrees of freedom of movement relative to said device and means coupling said actuating means to said transferring means and to said means for varying pressure, whereby movement of said actuating means in one of said degrees of freedom controls fluid transfer and movement in the other degree controls fluid pressure.

7. A fluid pressure regulating and transfer system comprising a source of pressurized fluid, valve means including a piston slideable within a sleeve for defining fluid transfer conduits therebetween, pressure regulating means carried by said piston for controlling the pressure of said fluid, and actuating means for both moving said piston to operate said valve means and for varying said pressure regulating means to vary said fluid pressure.

8. A fluid pressure regulating and transfer system comprising a source of pressurized fluid, valve means including a fluid transfer piston slideably moveable within a sleeve for defining different fluid transfer conduits therebetween at different positions within said sleeve, pressure regulating means carried by said piston for controlling the pressure of said fluid and actuating means for both moving said piston to operate said valve means and for operating said pressure regulating means at at least one of said different positions to vary said fluid pressure.

9. A fluid pressure regulating and transfer system comprising a source of pressurized fluid, a fluid transfer piston slideably moveable within a sleeve for defining different fluid conduits therebetween at different positions of said piston within said sleeve, means carried by said piston for controlling the pressure of said fluid in at least one of said different conduits, and actuating means for both moving said piston to said different positions and for operating said pressure control means.

10. A fluid pressure regulating and transfer system for directing the flow of pressurized fluid to and from a utilizing system and for regulating the pressure of said fluid comprising a source of pressurized fluid, a single module including a housing, a transfer piston slideably moveable within said housing, fluid ports in said housing, fluid chambers in said transfer piston which connect with said ports depending upon the position of said piston within said housing, a fluid pressure regulating piston slideably disposed within said transfer piston, an actuator connected to said transfer piston for moving said piston within said housing and also engaging said regulating piston, and fluid passages interconnecting said chambers including openings controlled by said regulating piston, whereby motions of said actuator in one degree control the transfer of said fluid to and from said system and motions of said shaft in another degree control the pressure of the fluid directed to said system.

11. A fluid pressure regulating and transfer system for directing the flow of pressurized fluid to and from a utilizing system and for regulating the pressure of said fluid comprising a source of pressurized fluid, a single module including a housing, a transfer piston slideably moveable within said housing, fluid ports in said housing, fluid chambers in said transfer piston which connect with said ports depending upon the position of said piston within said housing, a fluid pressure regulating piston slideably disposed within said transfer piston, means for applying a force to said regulating piston which is representative of fluid pressure, an actuator connected to said transfer piston for moving said piston within said housing and also engaging said regulating piston for applying a force to said regulating piston in opposition to the first mentioned force applied to said regulating piston and fluid passages interconnecting said chambers including openings controlled by said regulating piston, whereby motions of said actuator in one degree control the transfer of said fluid to and from said system and motions of said actuator in another degree control the pressure of the fluid directed to said system.

12. A fluid pressure regulating and transfer system for directing the flow of pressurized fluid to and from a utilizing system and for regulating the pressure of said fluid comprising a source of pressurized fluid, a single module including a module housing, a transfer piston slideably disposed within said housing, fluid ports in said housing, fluid chambers in said transfer piston which connect with said ports depending upon the position of said piston within said housing, a fluid pressure regulating piston slideably disposed within said transfer piston, means for applying a force to said regulating piston which is representative of fluid pressure, a control shaft connected to said transfer piston for moving said piston within said housing and also engaging said regulating piston for applying a force to said regulating piston in opposition to the first mentioned force applied to said regulating piston, and fluid passages interconnecting said chambers including openings controlled by said regulating piston, whereby translational motions of said shaft control the transfer of said fluid to and from said system and rotational motions of said shaft control the pressure of the fluid directed to said system.

References Cited
UNITED STATES PATENTS

| | | | |
|---|---|---|---|
| 3,217,745 | 11/1965 | Tate | 137—625 X |
| 3,234,957 | 2/1966 | Allen | 137—596.12 X |
| 3,253,613 | 5/1966 | Richolt | 137—596 |
| 3,282,284 | 11/1966 | Harris et al. | 137—110 |

M. CARY NELSON, *Primary Examiner.*

H. KLINKSIEK, *Assistant Examiner.*